United States Patent [19]

Goldstein

[11] 4,078,991
[45] Mar. 14, 1978

[54] TREATMENT OF CLAY MATERIALS TO FORM SUPER-ACTIVE CATALYST

[75] Inventor: Theodore P. Goldstein, Yardley, Pa.

[73] Assignee: Mobil Oil Corporation, New York, N.Y.

[21] Appl. No.: 666,838

[22] Filed: Mar. 15, 1976

[51] Int. Cl.$^2$ ............................................. C10G 11/04
[52] U.S. Cl. .............................. 208/120; 208/11 R; 208/24; 208/39; 252/455 R; 260/666 P; 260/668 A; 260/672 R; 260/683.65
[58] Field of Search .................. 208/120, 11 R, 24, 27, 208/39

[56] References Cited

U.S. PATENT DOCUMENTS

| | | | |
|---|---|---|---|
| 2,744,057 | 5/1956 | Emmett | 208/120 |
| 2,825,699 | 3/1958 | McEvoy et al. | 252/449 |
| 2,862,875 | 12/1958 | Morrell | 208/119 |

*Primary Examiner*—Delbert E. Gantz
*Assistant Examiner*—G. E. Schmitkons
*Attorney, Agent, or Firm*—Charles A. Huggett; Raymond W. Barclay; Dennis P. Santini

[57] ABSTRACT

This invention relates to an improved method for treating clay materials to prepare a super-active catalyst for use in catalytic conversion of organic materials such as, for example, hydrocarbon compounds, heavy crude petroleum stock and kerogen, wherein when a clay material is contacted with a solution containing cations selected from the group consisting of transition metal ions, aluminum ions, hydrogen ions, ions of metals from Group IIB of the Periodic Table of Elements and a combination thereof with each other, the clay material is in the raw state and maintained at a temperature not exceeding about 100° C prior to and during the contacting with said solution and thereafter heating said exchanged clay material to a temperature of at least about 50° C but not exceeding about 250° C in the presence of air and/or organic material which is to be catalytically converted. Further, this invention relates to the clay material which is the product of the above improved method and to converting organic materials such as, for example, hydrocarbons, heavy crude petroleum stock and kerogen, by contact at low temperature, e.g. from about 50° C to about 250° C, with said clay material.

8 Claims, No Drawings

TREATMENT OF CLAY MATERIALS TO FORM SUPER-ACTIVE CATALYST

BACKGROUND OF THE INVENTION

1. Field of the Invention

This invention relates to an improved method for treating clay materials to prepare a super-active catalyst, the catalyst so prepared and low temperature catalytic conversion of organic materials therewith.

2. Discussion of Prior Art

The activation of naturally-occurring and/or synthetic clay-type materials by mineral acid washing or by thermal decomposition of the ammonium-exchanged form of said clay to prepare catalysts for high temperature reactions conducted at over 400° C is known in the art (Chem. Rev., 385–399, 74, 1974). These materials were among the first of the cracking catalysts. They are most effective when largely in their hydrogen form with reaction temperatures in the range of 400° C to 500° C.

Activation of aluminosilicate zeolites by ion-exchange with ions such as rare rare earth and hydrogen for use in high temperature hydrocarbon conversion reactions is also known in the art.

By the present method, a raw clay, without having been heated to a temperature exceeding 100° C, is ion-exchanged with transition metal ions, hydrogen ions, aluminum ions, ions of metals from Group IIB of the Periodic Table or a combination thereof at a temperature not exceeding 100° C and the resulting exchanged clay material is exposed to a temperature of at least about 50° C but not exceeding about 250° C. This is believed novel, whereby high temperatures are avoided before, during and after ion exchange of the clay.

Catalytic conversion methods of the type to which this invention pertains are well known in the art. However, these methods over a clay catalyst at low temperature, e.g. 50° C to 250° C, have not been reported to produce significant conversions of charge stock. For instance, greater than 0.5 weight percent coversion in catalytic cracking of a hydrocarbon over a clay catalyst at lower than 400° C has not been reported.

References showing the state of the art as related to the present invention include U.S. Pat. No. 2,480,627, which teaches reactivating used (and therefore heated to temperatures over 400° C) clay catalysts, by introducing an alkali metal into said used clay and then base exchanging the alkali metal so introduced into said used clay with various other metals. The catalyst so reactivated is then taught to be effective in a high temperature (800° F) catalytic conversion of gas oil. Other references showing the state of the related art but which fall short of teaching the present improved method and catalytic conversion processes include U.S. Pat. Nos. 3,515,679; 3,278,417; 2,982,717; 2,848,423; 2,825,699; 2,727,868; 2,862,874 and 2,744,057 and Great Britain Pat. Nos. 847,528 and 1,085,758.

SUMMARY OF THE INVENTION

This invention contemplates an improved method for preparing a clay material catalyst for use in low temperature organic compound cracking, low temperature heavy crude petroleum stock viscosity lowering and low temperature decomposing of kerogen. The lack of severe catalyst preparation conditions, the ease of treatment and the mild catalytic conversion conditions make the subject of the present invention highly desirable from an economic and engineering view point.

DESCRIPTION OF SPECIFIC EMBODIMENTS

Clay materials for use in the improved treatment of the present invention include compositions composed the clay minerals identified as hydrated aluminum silicates having the general formula $Al_2O_3 \cdot xSiO_2 \cdot yH_2O$ wherein $x$ is an integer of from about 0.5 to about 600 and $y$, depending upon the state of hydration of the clay material, is from about 1 to about 300, and wherein said hydrated aluminum silicate clay mineral may have associated therewith, for example, one or more metals or metal oxides selected from the group consisting of Group A, IIA and VIII of the Periodic Table of Elements. Non-limiting examples of such hydrated aluminum silicate minerals which comprise the major proportion of clays for use in the present improved treatment include:

kaolinite ($Al_2O_3 \cdot 2SiO_2 \cdot nH_2O$),
halloysite ($Al_2O_3 \cdot 3SiO_2 \cdot nH_2O$),
attapulgite (($Mg, Al)_5 Si_8O_{22}(OH)_4 \cdot nH_2O$),
montmorillonite (($Mg, Ca)O \cdot Al_2O_3 \cdot 5SiO_2 \cdot nH_2O$) and
illite ($K_2O$, $MgO$, $Al_2O_3$, $SiO_2$, $H_2O$; all in variable amounts).

The quantity $n$ of the above general formulas depends upon the degree of hydration of the particular clay mineral and will most often be between about 1 and about 300. Since the clay mineral for use herein must not be heated to a temperature exceeding 100° C prior to or during ion exchange, $n$ will seldom be below about 1.

Non-limiting examples of clays for use in the present improved treatment include:

fuller's earth — a clay material having high natural adsorptive powers which is usually composed largely of the clay mineral attapulgite with some montmorillonite, kaolin — a clay material being mainly constituted of the mineral kaolinite, and bentonite — a clay containing appreciable amounts of the clay mineral montmorillonite and usually having some magnesium and iron associated therewith.

The clay material for treatment hereby must be in the raw state and must have been heated to a temperature exceeding about 100° C prior to ion-exchange with the above listed cations. Ion exchange of the clay material may be conducted by means well known in the art so long as the temperature of the clay during said exchange does not exceed about 100° C. Typical ion-exchange techniques include contacting the clay material (which is in the raw state and which has not been heated to a temperature exceeding 100° C) with a salt solution of the desired cation or cations. Although a wide variety of salt solutions may be employed, preference is given to chlorides, nitrates and sulfates.

During the contacting of the clay material with the salt solution the temperature must be maintained at less than about 100° C and following said contacting the clay material is preferably washed with water and dried at a temperature not exceeding about 250° C. The exchanged clay material may be heated to a temperature of between about 50° C and about 250° C in an atmosphere of air or in the presence of an organic material, e.g. heavy crude petroleum stock, to be catalytically converted. It is critical that no calcination of the exchanged clay material at higher temperatures take place.

The cations useful for exchange into the clay material hereby include aluminum ions, hydrogen ions, ions of metals from Group IIB of the Periodic Table, transition metal ions and combinations thereof. By transition metal ions it is meant the cations of elements in which the filling of the outermost shell to 8 electrons within a period is interrupted to bring the penultimate shell from 8 to 18 or 32 electrons. These elements can use penultimate shell orbitals as well as outermost shell orbitals in bonding. Transition metal elements include those having atomic numbers of from 21 to 29, from 39 to 47, from 57 to 79 and from 89 on, inclusive. Those having atomic numbers of from 57 to 71, inclusive, are located in Group IIIB of the Periodic Table of Elements and are commonly named rare earth elements.

When the present method of treatment for the clay material is followed, a super-active clay catalyst is the result. Said clay catalyst is useful for cracking organic compounds at mild reaction conditions including a low temperature of from about 150° C to about 250° C, and preferably of from about 180° C to about 220° C, a pressure of from about 0 psig to about 500 psig, and preferably of from about 0 psig to about 100 psig, a WHSV of from about 0.001 to about 20, and preferably of from about 0.01 to about 1 and in the absence of added hydrogen.

Non-limiting examples of organic compounds which may be cracked according to the present process include hydrocarbons such as, for example, paraffinic, naphthenic and aromatic hydrocarbons and those having structures with paraffinic, naphthenic and/or aromatic components; carboxylic acids; amines; alcohols; ketones; aldehydes; waxes and lipids.

The present super-active clay catalyst is also useful for reducing the viscosity of heavy crude petroleum stocks at mild reaction conditions including a low temperature of from about 50° C to about 250° C, and preferably of from about 150° C to about 200° C, a pressure of from about 0 psig to about 20,000 psig (since geopressures in wells range from 0 psig to about 20,000 psig and this procedure may be accomplished in a well), and preferably of from about 0 psig to about 1000 psig, a WHSV of from about 0.001 to about 50, and preferably of from about 0.1 to about 5 and in the absence of added hydrogen.

Non-limiting examples of heavy crude petroleum stocks which may be reduced in viscosity according to the present process include Celtic crude, Venezuelan crude, naphthenic and waxy crudes and crudes as extracted from tar sands or oil shales.

The super-active clay catalyst produced by the method of this invention is also useful for decomposing kerogen at mild reaction condition including a low temperature of from about 50° C to about 250° C, and preferably of from about 150° C to about 200° C, a pressure of from about 0 psig to about 20,000 psig, and preferably of from about 0 psig to about 1000 psig, a contact time of from about 5 minutes to about 10 years and in the adsence of added hydrogen.

Kerogen is the organic matter which is found in many sediments and sedimentary rocks, e.g. oil shales, and which is insoluble in common organic solvents such as, for example, benzene and chloroform. It is supposed that at least some portion of petroleum is formed from kerogen. Some skilled art workers believe that kerogen is the immediate precursor to petroleum oil. It is believed that kerogen contains highly strained or activated bonds and is not a definite compound but a complex mixture of various complex compounds that vary from one sediment or sedimentary rock location to another.

The following examples demonstrate the present invention and are not to be considered limiting in any way.

EXAMPLE 1

About 25 grams of powdered raw bentonite clay which has not been heated to a temperature exceeding 100° C and with an exchange capacity of 0.9 meq/gram was contacted with a liter of 1 N HCl solution at room temperature and atmospheric pressure for 30 minutes to form a hydrogen ion exchanged bentonite clay. The exchanged clay was collected by centrifugation and washed with distilled water. Centrifugation and washing with distilled water were repeated until the water was free from chloride ions as indicated by a AgCl test.

EXAMPLE 2

An aluminum ion exchanged bentonite clay was prepared as in Example 1 by using a $AlCl_3 \cdot 6H_2O$ solution of about 5N in place of the HCl solution.

EXAMPLE 3

A thorium ion exchanged bentonite clay was prepared as in Example 1 by using a hydrated $ThCl_4$ solution of about 5N in place of the HCl solution.

EXAMPLE 4

A cadmium ion exchanged bentonite clay was prepared as in Example 1 using a $CdCl_2 \cdot 2\frac{1}{2} H_2O$ solution of about 5N in place of the HCl solution.

EXAMPLE 5

A cobalt ion exchanged bentonite clay was prepared as in Example 1 using a concentrated $CoCl_2 \cdot 6H_2O$ solution in place of the HCl solution.

EXAMPLE 6

An iron ion exchanged bentonite clay was prepared as in Example 1 using a concentrated $Fe(NO_3)_3 \cdot 9H_2O$ solution in place of the HCl solution.

EXAMPLE 7

A nickel ion exchanged bentonite clay was prepared as in Example 1 using a concentrated $NiCl_2 \cdot 6H_2O$ solution in place of the HCl solution.

EXAMPLE 8

A copper ion exchanged bentonite clay was prepared as in Example 1 using a concentrated $CuCl_2 \cdot 2H_2O$ solution in place of the HCl solution.

EXAMPLE 9

Another hydrogen ion exchanged bentonite clay was prepared by contacting a 25 gram quantity of powdered raw Wyoming bentonite which had not been heated to a temperature exceeding 100° C with 4 bed volumes of 1 N HCl solution at room temperature and atmospheric pressure. The powdered raw bentonite was wet packed into a glass chromatograph column for contacting with the HCl solution. After contact with the HCl solution, the clay was transferred to a buchner funnel, placed under vacuum to remove excess liquid and then air dried overnight at room temperature.

EXAMPLES 10-22

In order to demonstrate the significant benefit of the present improved method for treatment of clay materials, a low temperature hydrocarbon compound cracking reaction was performed over a narrow range of low temperatures with the clay materials prepared in Examples 1 and 9 as the catalyst. Also, for comparison purposes, several other known cracking catalyst materials as well as a portion of the clay material prepared in Example 1 which had thereafter been heated to a temperature exceeding 250° C for one hour were used as the catalyst. The reaction vessel consisted of a quartz or pyrex micro reactor tube. The micro reactor, charge pumping equipment and temperature controller were of standard design. The reaction procedure consisted of pumping the charge stock (at a constant rate) over the catalyst. The catalyst bed was maintained at constant temperature by use of an annular heater equipped with a device to sense and control the temperature of the catalyst bed. The products were analyzed by chromatographic techniques. In each reaction, the pressure was maintained at 0 psig without use of added hydrogen. Other reaction conditions and results are listed in Table 1.

TABLE 1

Low Temperature Cracking Reactions of Examples 10-22

| Example | Catalyst | Hydrocarbon Charge Stock | Temperature, ° C | WHSV | Conversion, Wt. % |
|---|---|---|---|---|---|
| 10 | Example 1 | n-hexadecane | 203 | 0.1 | 41.6 |
| 11 | Example 1 | n-hexadecane | 170 | 1.0 | 2.5 |
| 12 | Example 1 | n-hexadecane | 200 | 1.0 | 5.0 |
| 13 | Example 1 | n-hexadecane | 218 | 1.0 | 7.0 |
| 14 | Example 1 | n-hexylcyclohexane | 180 | 1.0 | 27.0 |
| 15 | Example 1 | n-hexadecane | 150-152 | 0.1 | 1.5 |
| 16 | Example 9 | n-hexadecane | 160 | 1.0 | 0.4 |
| 17 | Example 9 | n-hexadecane | 188 | 1.0 | 2.8 |
| 18 | Portion of Example 1 material which was thereafter heated to 500° C for one hour | n-hexadecane | 200 | 1.0 | nil |
| 19 | Portion of Example 1 material which was thereafter heated to 500° C for one hour | n-hexadecane | 200 | 0.3 | nil |
| 20 | Sodium bentonite | n-hexadecane | 200 | 0.35 | nil |
| 21 | Raw bentonite | n-hexadecane | 200 | 0.35 | nil |
| 22 | Commercial silica alumina cracking catalyst | n-hexadecane | 218 | 0.35 | nil |

An interesting phenomenon observed during the above experiments was that the products of the present low temperature cracking of n-hexadecane process provided products chiefly composed of branched paraffins in the gasoline-kerosine boiling range. For instance, the present low temperature cracking process over a clay catalyst prepared as in Example 1 may provide product from a n-hexadecane charge stock having an iso-$C_4$: n-$C_4$ ratio of over 5, such as, for example, about 5.6, and an iso-$C_5$: n-$C_5$ ratio of over 7, such as, for example, about 7.8.

EXAMPLE 23

A sample of heavy crude petroleum stock, designated Celtic crude, was passed over a bed of 60-80 mesh clay material prepared as in Example 8 at a contact temperature of only 175° C and 197° C, a WHSV of 1.2 and a pressure of 0 psig. The viscosity of the starting, uncontacted crude and the contacted crude was measured at 25° C using a Brookfield viscometer. Relative viscosities are listed in Table 2.

Table 2

| Sample | Relative Viscosity | Bed Volumes Crude | Temperature, ° C |
|---|---|---|---|
| untreated crude | 1 | 0 | — |
| 1 | 0.80 | 1 | 175 |
| 2 | 1 | 1 | 175 |
| 3 | 0.67 | 2 | 197 |
| 4 | 0.86 | 1 | 197 |
| 5 | 0.80 | 1 | 197 |
| 6 | 0.72 | 1 | 197 |
| 7 | 0.85 | 1 | 197 |

EXAMPLE 24

A sample of "mineral free" kerogen having the following composition:

| Component | Wt. % |
|---|---|
| C | 70.8 |
| H | 8.0 |
| O | 8.0 |
| S | 7.6 |
| N | 0.9 |
| ash | 3.0 | was isolated from sediments collected from the Todilto formation (Jurassic-New Mexico). The kerogen was heated at temperatures between 100° and 200° C with and without contact with a clay material prepared as in Example 1. The effect of adding a catalyst to the kerogen was studied in "batch reactions" and by a thermogravimetric (TGA) technique.

In the TGA experiments, clay, kerogen, and clay intimately mixed with kerogen were heated (under a helium atmosphere) to constant weight at 100° C, and the change in weight on further heating to 200° C at 2°/min. monitored with time. The results are summarized in Table 3, hereinafter presented.

All of the samples lost weight on heating. In the case of the clay, the decrease in weight is due to removal of sorbed water. When the mineral free kerogen was heated, the weight decrease resulted mainly from loss of volatile organic compounds. But the large weight loss observed on heating the kerogen-clay mixture is greater than can be accounted for by the additive weight loss on heating the individual components. From the data (Table 3) it is estimated that the kerogen will yield about 1.6-2 times as much volatile products when mixed with a clay material catalyst made according to the present improved method than when heated alone.

A similar result was obtained in the "batch" experiments. Here, equal amounts of kerogen were heated with and without contact with a clay material prepared as in Example 1 under the conditions listed in Table 3. At the end of the reaction period, the pentane soluble components of the reaction mixture were extracted and analyzed by gas chromatography on a "boiling point" column. It was observed that the clay mediated reaction produced significantly more compounds boiling below n-$C_{11}$ (kerosine-gasoline range) than did the clay free system. Further, it appeared that some of the lower molecular weight materials were formed at the expense of compounds boiling above n-$C_{18}$.

More particularly, the batch reactions were performed under a nitrogen atmosphere in flasks fitted with water-cooled condensers and manometers. In these reactions 0.4 gram of kerogen and 0.4 gram of kerogen intimately mixed with 2.0 grams of the clay material were heated at 175° C for 24 hours. Less than 5 cc. of gases were evolved in either reaction. At the end of the reaction period, the reactors were cooled, and n-pentane (about 50 cc.) was used to wash the reactors and their contents. The pentane extracts were concentrated, adjusted to the same volume (5 cc.) and the concentrates gas chromatographed using a 15% Dexsil column for separation of components according to boiling point. There appeared to be about 1.4 times as much material in the pentane extract from the clay-kerogen reactions as in the reactions without clay.

The TGA experiments were performed in a helium atmosphere, using a Dupont Thermogravimetric analyzer. The kerogen-clay mixture was prepared by thoroughly mixing 0.415 gram of Todilto kerogen with 2.0 grams of the clay material in a water slurry followed by removal of the water by vacuum filtration. The kerogen and clay samples were slurried in water and recovered by filtration in a similar way. The air dried samples were spread on watch glasses and stored in a closed glass jar for several days before use in order to establish moisture equilibrium among them. The following protocol was followed in the TGA runs: samples were heated in helium from room temperature to 100° C at 10° C per min., maintained at 100° C for 30 min., and the weight change on heating from 100° C to 200° C at 2° per min. measured.

Table 3
Summary of the TGA Experiment of Example 24

| Sample | wt. at 100° C (mg) | wt. at 200° C (mg) | weight change (mg) |
|---|---|---|---|
| 1) kerogen-clay catalyst** (17.2 wt%–82.8 wt%) | 28.15 | 27.50 | −0.65 |
| 2) mineral free kerogen | 7.28 | 6.96 | −0.32 |
| 3) clay catalyst | 42.20 | 41.85 | −0.35 |

**Predicted weight loss for ketogen-clay catalyst mixture assuming no interaction between kerogen and clay:

(a) clay component, $\frac{28.15}{42.20}$ (0.838) (0.35)mg = 0.193mg.

Table 3-continued
Summary of the TGA Experiment of Example 24

| Sample | wt. at 100° C (mg) | wt. at 200° C (mg) | weight change (mg) |
|---|---|---|---|
| (b) kerogen component, $\frac{28.15}{7.28}$ | (0.172) | (0.32)mg | = 0.213 mg. |

$$\text{wt loss, } \frac{\text{observed}}{\text{predicted}} = \frac{0.65}{(a) + (b)} = \frac{0.65}{0.406} = 1.6$$

$$\frac{\text{observed loss} - \text{predicted loss}}{\text{predicted loss (kerogen)}} = 2.1$$

What is claimed is:

1. In a method for catalytic cracking of organic material which comprises contacting said organic material with a clay material composed primarily of clay minerals selected from the group consisting of kaolinite, halloysite, attapulgite, montmorillonite, illite and combinations thereof, said clay material having been contacted with a solution containing cations selected from the group consisting of transition metal ions, hydrogen ions, aluminum ions, ions of metals from Group IIB of the Periodic Table of Elements and a combination thereof to effect ion exchange of said clay material with said ions, the improvement which comprises using conversion conditions including a low temperature of from about 50° C to about 250° C, said clay material prior to said contact with said solution being in the raw state as found in nature or synthesized and said clay material not being exposed to a temperature exceeding 100° C prior to and during said contact with said solution and not being exposed to a temperature above 250° C. after contact with said solution.

2. The method of claim 1 wherein said cracking conditions include a temperature of from about 150° C to about 250° C, a pressure of from about 0 psig to about 500 psig and a weight hourly space velocity of from about 0.001 to about 20.

3. The method of claim 2 wherein said cracking conditions include a temperature of from about 180° C to about 220° C, a pressure of from about 0 psig to about 100 psig and a weight hourly space velocity of from about 0.01 to about 1.

4. The method of claim 2 wherein said organic material charge stock is a hydrocarbon compound.

5. The method of claim 1 wherein said catalytic cracking is reducing the viscosity of heavy crude petroleum stock and said cracking conditions include a pressure of from about 0 psig to about 20,000 psig and a weight hourly space velocity of from about 0.001 to about 50.

6. The method of claim 5 wherein said cracking conditions include a temperature of from about 150° C to about 200° C, a pressure of from about 0 psig to about 1000 psig and a weight hourly space velocity of from about 0.1 to about 5.

7. The method of claim 1 wherein said catalytic cracking is decomposing kerogen and said cracking conditions include a pressure of from about 0 psig to about 20,000 psig and a contact time of from about 5 minutes to about 10 years.

8. The method of claim 7 wherein said cracking conditions include a temperature of from about 150° C to about 200° C and a pressure of from about 0 psig to about 1000 psig.

* * * * *

UNITED STATES PATENT AND TRADEMARK OFFICE
CERTIFICATE OF CORRECTION

PATENT NO. : 4,078,991

DATED : March 14, 1978

INVENTOR(S) : Theodore P. Goldstein

It is certified that error appears in the above-identified patent and that said Letters Patent are hereby corrected as shown below:

Column 2, line 11, "material" should be -- mineral --.

Column 2, line 45, "must have" should read -- must not have --.

Column 3, line 53, "condition" should read -- conditions --.

Signed and Sealed this

Twelfth Day of September 1978

[SEAL]

Attest:

RUTH C. MASON
*Attesting Officer*

DONALD W. BANNER
*Commissioner of Patents and Trademarks*